United States Patent
Hermann

(10) Patent No.: US 6,595,544 B1
(45) Date of Patent: Jul. 22, 2003

(54) APPARATUS FOR OCCUPANT PROTECTION IN A MOTOR VEHICLE

(75) Inventor: Stefan Hermann, Köfering (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/541,686

(22) Filed: Apr. 3, 2000

Related U.S. Application Data

(63) Continuation of application No. PCT/DE98/02909, filed on Sep. 30, 1998.

(30) Foreign Application Priority Data

Oct. 2, 1997 (DE) .......................... 197 43 738

(51) Int. Cl.$^7$ .............................................. B60R 21/35
(52) U.S. Cl. ..................... 280/735; 180/274; 180/282; 701/45
(58) Field of Search ................ 280/735; 180/282, 180/274; 701/45, 47

(56) References Cited

U.S. PATENT DOCUMENTS

| | | | | |
|---|---|---|---|---|
| 3,870,894 A | * | 3/1975 | Brede et al. ............... | 180/274 |
| 4,836,024 A | * | 6/1989 | Woehrl et al. .............. | 280/735 |
| 5,173,614 A | * | 12/1992 | Woehrl et al. .............. | 280/735 |
| 5,390,951 A | * | 2/1995 | Iyoda ........................ | 280/735 |
| 5,428,534 A | * | 6/1995 | Wetzel et al. ............... | 280/735 |
| 5,483,447 A | * | 1/1996 | Jeenicke et al. ............ | 280/735 |
| 5,513,109 A | * | 4/1996 | Fujishima ................... | 280/735 |
| 5,544,716 A | * | 8/1996 | White ........................ | 280/735 |
| 5,609,358 A | * | 3/1997 | Iyoda et al. ................ | 280/735 |
| 5,767,766 A | * | 6/1998 | Kwun ......................... | 280/735 |
| 5,900,807 A | * | 5/1999 | Moriyama et al. ........... | 280/735 |
| 5,962,787 A | * | 10/1999 | Okada et al. ............... | 73/514.32 |
| 5,995,892 A | * | 11/1999 | Kiribayashi et al. ......... | 701/45 |
| 6,052,634 A | * | 4/2000 | Pathe et al. ................ | 701/45 |
| 6,113,138 A | * | 9/2000 | Hermann et al. ............ | 280/735 |

FOREIGN PATENT DOCUMENTS

| | | |
|---|---|---|
| DE | 1 200 585 | 9/1965 |
| DE | 2 207 831 | 8/1973 |
| DE | 37 29 019 A1 | 3/1989 |
| DE | 37 36 294 A1 | 5/1989 |
| DE | 39 18 407 A1 | 12/1990 |
| DE | 42 20 270 A1 | 12/1993 |
| DE | 43 09 827 C2 | 9/1994 |
| DE | 195 28 026 A1 | 2/1997 |
| EP | 0305654 A2 | 3/1989 |
| EP | 0 305 654 | * 3/1989 |

OTHER PUBLICATIONS

Article on transducers: "transducer" Encyclopedia Britannica http//www.search.eb.com/eb/article?eu=75100.*

* cited by examiner

Primary Examiner—Paul N. Dickson
Assistant Examiner—Ruth Ilan
(74) Attorney, Agent, or Firm—Laurence A. Greenberg; Werner H. Stemer; Gregory L. Mayback

(57) ABSTRACT

An apparatus for occupant protection in a vehicle, having a sensor for picking up a transverse deflection of structure-borne sound of a body component of the vehicle, and having an evaluator for controlling an occupant protection device of the vehicle depending on the structure-borne sound that is picked up.

18 Claims, 1 Drawing Sheet

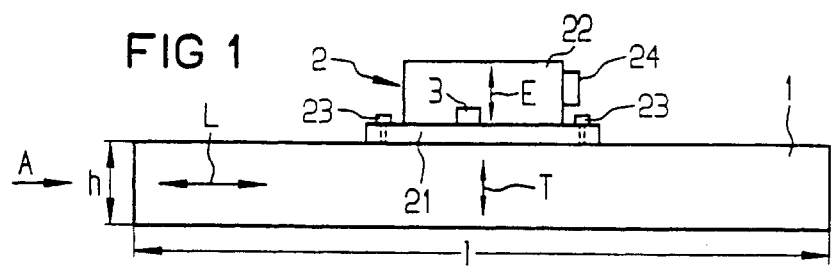
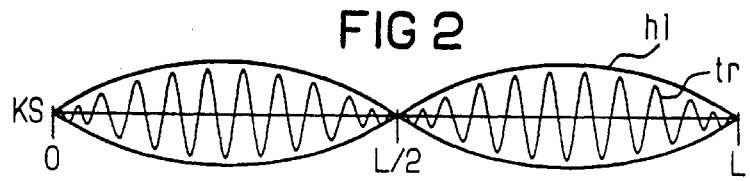
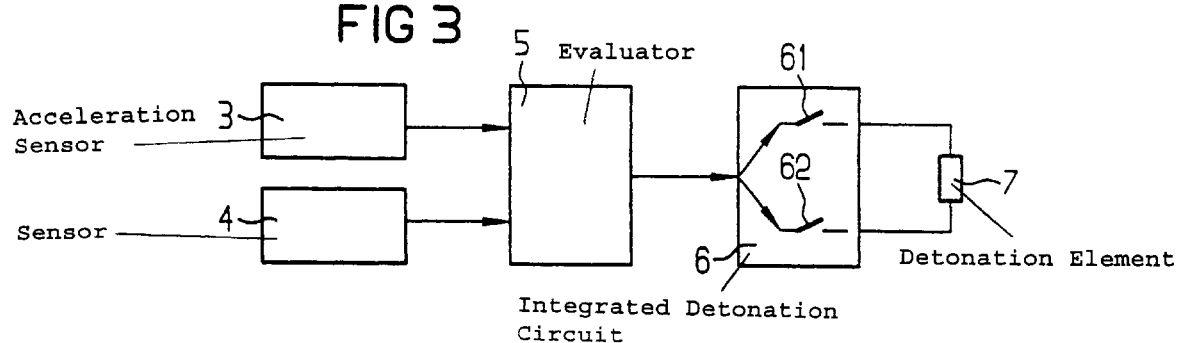
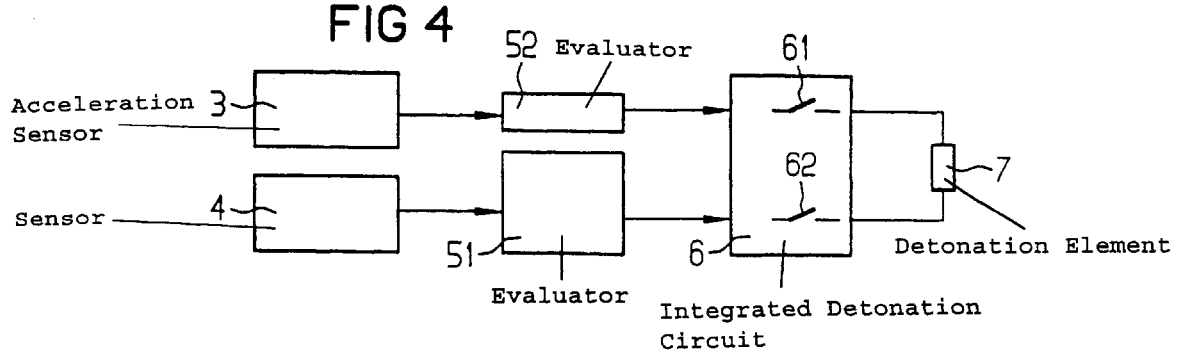

APPARATUS FOR OCCUPANT PROTECTION IN A MOTOR VEHICLE

CROSS-REFERENCE TO RELATED APPLICATION

This is a continuation of copending International Application PCT/DE98/02909, filed Sep. 30, 1998, which designated the United States.

BACKGROUND OF THE INVENTION

Field of the Invention

The invention relates to an apparatus for occupant protection in a motor vehicle.

Published non-prosecuted German Patent Application DE 37 29 019 A1 discloses an apparatus for occupant protection in a motor vehicle with sound or structure-borne sound sensors. From the sound or structure-borne sound that is picked up, an evaluator distinguishes a collision from other noises and interference.

All the known apparatuses for occupant protection that have structure-borne sound sensors pick up longitudinal structure-borne sound deflections of a body component of the motor vehicle. If the body component is embodied for instance as an elongated metal bearer oriented parallel to the longitudinal axis of the vehicle, then this longitudinal bearer, in a front-end collision, is set into longitudinal oscillation either directly by the obstacle striking the longitudinal bearer, or indirectly via other body components. A structure-borne sound sensor, for instance in the form of a strain gauge mounted on the longitudinal bearer, picks up longitudinal oscillations of the longitudinal bearer. Because of their low amplitudes, these longitudinal oscillations must be amplified and evaluated at great effort and expense, if enough information is to be obtained from the structure-borne sound that is picked up, and moreover they occur only in the direction of impact.

SUMMARY OF THE INVENTION

It is accordingly an object of the invention to provide an apparatus for occupant protection in an motor vehicle, which overcomes the hereinafore-mentioned disadvantages of the heretofore-known devices that can be produced at little effort or expense yet still furnishes an adequately sensitive signal for detecting a collision.

With the foregoing and other objects in view there is provided according to the invention, a sensor for picking up structure-borne sound secured to a body component, the sensor is set into structure-borne sound oscillation in the event of a collision, or is at least vibrationally coupled to the body component, in such a way that it picks up transverse components of the structure-borne sound oscillations, and thus a transverse structure-borne sound deflection of the body component. Depending on the structure-borne sound that is thus picked up—hereinafter called merely structure-borne sound—an evaluator controls an associated occupant protection device of the motor vehicle.

The advantage of the apparatus of the invention is in particular that the sensor that picks up transverse structure-borne sound deflections furnishes an electrical signal that represents useful oscillations sufficiently sensitively and is sufficiently insensitive to interference factors such that a collision with the vehicle can be detected with no uncertainty by the measured structure-borne sound. A transverse structure-borne sound is picked up regardless of the direction from which the collision occurs.

The following discussion will simply refer to the evaluation of the structure-borne sound in conjunction with the evaluation of the electrical signal furnished by the structure-borne sound sensor.

In accordance with one feature of the invention, the structure-borne sound sensor are disposed in a control unit for occupant protection in a motor vehicle. Such a control unit is conventionally solidly connected to a body component, for instance being screwed to it. The existing disposition of such a control unit can advantageously be used, by a suitable disposition of the structure-borne sound sensor in the control unit, for picking up transverse structure-borne sound deflections, without requiring that the structure-borne sound sensor be disposed remotely from the control unit and electrically connected to the control unit and the evaluator in it over lines that are vulnerable to interference and are hard to install. The control unit is preferably disposed approximately centrally in the vehicle in the tunnel; the vehicle tunnel itself is embodied as a rigid body component, or is connected to such a body component, such as a longitudinal bearer.

Another feature of the invention is the advantageous embodiment of the structure-borne sound-sensor. Tripping of the occupant protection device is initiated preferably in dependence of the evaluation of these parameters; besides evaluating the structure-borne sound, it is advantageously possible for still other sensed variables, such as occupant or occupant position detection, to enter into a final tripping decision.

Another feature of the invention is the advantageous refinement of the apparatus, in which the occupant protection device is tripped in dependence of both the structure-borne sound that is picked up and an acceleration that is picked up by an acceleration sensor. Such an apparatus has the advantage that to trip an associated occupant protection device, a collision must have been detected by two sensors based on different physical principles. This prevents tripping caused by a defective sensor, interference signals, or vibration signals caused for instance by traveling over a gravel surface, and it substantially increases the tripping safety and reliability of the overall apparatus.

Other features which are considered as characteristic for the invention are set forth in the appended claims.

Although the invention is illustrated and described herein as embodied in an apparatus for occupant protection in a motor vehicle, it is nevertheless not intended to be limited to the details desired, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic, cross-sectional view of a longitudinal section through a body component, to which a control unit is secured according to the invention;

FIG. 2 is an illustration of a structure-borne sound wave along the body component of FIG. 1;

FIG. 3 is a block circuit diagram of an apparatus according to the invention; and FIG. 4 is a block circuit diagram of the apparatus according to the invention.

DESCRIPTION OF THE PREFERRED EMBODIMENTS

Referring now to FIG. 1 of the drawings in detail, FIG. 1 shows a motor vehicle longitudinal bearer as a body component 1, having a length l, a height h, and a width which cannot be seen and is not represented by a symbol. A control unit 2 also shown in longitudinal section is disposed on the body component 1. In FIG. 1, the control unit 2 is shown on a substantially larger scale than the body component 1, for the sake of illustrating specific details of the control unit.

The control unit 2 has a base plate 21 and a housing 22 secured to the base plate 21. The base plate 21 is joined firmly via screws 23 to the body component 1, so that structure-borne sound oscillations of the body component 1 in particular are transmitted well to the control unit 2 and in particular to the base plate 21 and the housing 22. A structure-borne sound sensor 3 is disposed on the base plate 2. A plug connector 24 is also disposed on the housing 22.

Upon a collision A from the direction indicated, the body component 1 emits structure-borne sound as a result of its direct or indirect contact with the colliding obstacle. For ascertaining structure-borne sound, longitudinal waves L with a direction of deflection indicated by the arrow in FIG. 1 can be picked up in a manner known per se by a suitable structure-borne sound sensor. According to the invention, however, transverse structure-borne sound waves T with a direction of deflection indicated by the corresponding arrow in FIG. 1 are picked up by a suitable structure-borne sound sensor. The transverse structure-borne sound waves T are oriented crosswise to the longitudinal waves L. The transverse oscillations of the structure-borne sound, because of the rigid fastening of the control unit 2 to the body component 1, are transmitted by the body component to the structure-borne sound sensor 3. A sensitivity axis E, shown by an arrow in FIG. 1, of the structure-borne sound sensor 3, which is preferably embodied as a piezoelectric sensor, is oriented for picking up the transverse structure-borne sound deflection.

The structure-borne sound sensor 3 measures the deflection of the body component 1 in the transverse direction; measuring the deflection is equivalent, and patent protection is equally claimed for it, to a measurement of the speed or acceleration of the body component in the transverse direction.

FIG. 2 shows a standing structure-borne sound wave KS -occurring as a consequence of the collision A and with deflection in the transverse direction along the length 1 of the body component 1 of FIG. 1. The structure-borne sound wave KS for instance has oscillation nodes at the beginning 0 and end 1 as well as in the middle ½ of the body component 2, but conversely has antinodes at ¼ and 3¼. The structure-borne sound sensor 3 should not be disposed at a point along the body component 1 where with at least high likelihood an oscillation node in the structure-borne sound wave KS is expected in the event of a collision, but rather in a region of an expected antinode. For instance, if the structure-borne sound sensor 3 is embodied as a piezoelectric sensor and is excited in its normal operating mode with a carrier oscillation tr, then as a consequence of the collision, the carrier oscillation is amplitude modulated in accordance with FIG. 2. For the structure-borne sound that is picked up by the structure-borne sound sensor 3, the envelope curve hl of the amplitude modulated carrier oscillation tr is then definitive. The carrier oscillation tr is filtered out by a low-pass filter.

If the body component 1 of FIG. 1 is a longitudinal bearer of the motor vehicle, or in other words is disposed parallel to the longitudinal axis of the vehicle, then the orientation of sensitivity of the structure-borne sound sensor 3 is also predestined to pick up transverse waves not only in the event of a collision A from the front but also in a collision, not shown, from the side of the vehicle, since for that collision direction as well, the structure-borne sound sensor 3 picks up the transverse component of structure-borne sound oscillations of the body component 1.

If an occupant protection device of the motor vehicle is to be tripped solely in dependence of the structure-borne sound detection in the motor vehicle, then advantageously at least two structure-borne sound sensors should be disposed in the motor vehicle and electrically connected to the evaluator. The structure-borne sound sensors should be disposed in space in such a way that from the two structure-borne sound signals, the direction of impact in a collision can be detected, especially by a comparison of the time of the two structure-borne sound signals. From the transit time comparison, it is possible to detect the speed of the penetrating structure, and its direction of penetration. Depending on the direction ascertained, one or more occupant protection devices, such as front or side air bags or belt tighteners are selected. The selected occupant protection device is tripped in dependence of the speed of the penetrating structure, which is derived from the two structure-borne sound signals.

In FIGS. 3 and 4, two block circuit diagrams of apparatuses according to the invention are shown. Each of the two apparatuses has the structure-borne sound sensor 3 and the acceleration sensor 4. The acceleration sensor 4 is oriented for instance in such a way that it detects a front-end collision. In FIG. 3, the evaluator 5 evaluates the signals of the structure-borne sound sensor 3 and acceleration sensor 4 and in dependence of them triggers controllable power stages 61 and 62 of an integrated detonation circuit 6; if the two controllable power stages 61 and 62 are made conducting, energy is imposed on a detonation element 7 of an occupant protection device. The evaluator 5 is embodied conventionally as a microprocessor but can also be embodied as some other logical or analog circuit.

The block circuit diagram of FIG. 4 differs from the block circuit diagram of FIG. 3 in that here each sensor 3 and 4 is assigned its own evaluator 51 and 52, respectively, which in turn each control one controllable power stage 62 and 61, respectively. In terms of their hardware, the two evaluators 51 and 52 can be implemented separately from one another or can also be embodied jointly as a microprocessor. The block circuit diagram of FIG. 4 is intended merely to express the fact that each controllable power stage 61 and 62 can be made conducting only as in dependence of either the structure-borne sound or the acceleration. Such an apparatus has the advantage that for instance if one of the two sensors 3 or 4 fails, tripping of the associated detonation element 7 by mistake can be prevented, since the other, still operational sensor 4 or 3 continues not to indicate any collision and thus the power stage 62 or 61 associated with that sensor 4 or 3 remains in the non-conducting state.

Preferably, as shown in FIG. 4, one of the controllable power stages 61 or 62 is made conducting at an early time by the associated evaluator 52 or 51 or the associated sensor 3 or 4, at which time a collision with a minimum intensity is detected. However, the minimum intensity is not the collision intensity beyond which protection of the occupants by an occupant protection device is required. The minimum intensity comparison is intended merely to insure that a collision of any kind will be detected. The sensor used for this purpose is known to professionals in this field as a safing sensor. The safing sensor prepares the tripping of the occupant protection device as soon as a minimum collision is detected, but prevents the occupant protection device from being tripped if the safing sensor does not detect any minimum collision when the further sensor, being defective, for instance, is calling for tripping. The further sensor or the associated evaluator does not make the associated controllable power stage conducting, during normal operation, until a time at which tripping of the protection device is considered to be absolutely necessary.

Advantageously, the acceleration sensor 4 can now take on the task of a safing sensor. To that end, the electronic acceleration sensor furnishes an analog output signal, which is filtered, amplified, optionally converted from analog to digital, and preferably integrated. After its integration, the signal is compared with a threshold value that is set relatively low. If the threshold value is exceeded, a collision at a minimum collision intensity is detected, so that as shown in FIG. 4, the evaluator 51 makes the controllable power stage 62 conducting. This assures that at least a slight collision from a certain direction - precisely the direction for which the acceleration sensor 4 is sensitive - is occurring. Evaluation by the evaluator 52 of the signal furnished by the structure-borne sound sensor 3 provides clear information as to whether the collision is strong enough to trip the associated occupant protection device. In particular, the level or amplitude of the structure-borne sound signal, or its envelope curve, is compared with a limit value. If the limit value, which is set relatively high, is exceeded, the controllable power stage 61 is made conducting by the evaluator 52, so that the occupant protection device is tripped. Preferably, however, such a simple limit value comparison is not used, or is not used by itself, to control the associated power stage. Instead, preferably, the frequency of the structure-borne sound signal and in particular its change of frequency over time is ascertained. If the length 1 of the body component 1 of FIG. 1 changes as a consequence of an obstacle penetrating it, then the frequency of the standing wave of FIG. 2 changes, it increases. A frequency change ascertained in this way is a measure for the speed of the penetrating obstacle and thus for the energy transmitted with the collision. A frequency change ascertained in this way is predestined for making the controllable power stage 61 conducting.

Instead of an analog acceleration sensor followed by the evaluator 51 and the controllable power stage 62, a mechanical acceleration sensor can also be used, which furnishes a switching signal if a minimum threshold value is exceeded. The detonation current circuit can be carried directly via the mechanical acceleration switch.

Alternatively, in an advantageous refinement, the structure-borne sound sensor 3 can be used as the safing sensor. Then a simple threshold value comparison of the structure-borne sound level with a threshold that is set relatively low suffices to make the controllable power stage 61 conducting. The analog signal furnished by the acceleration sensor 4 is amplified in the evaluator 51 and optionally converted from analog to digital and thereupon subjected to a tripping algorithm that is also complex. If a severe collision is detected, then the controllable power stage 62 is made conducting as well, so that the occupant protection device is tripped.

In a further advantageous refinement, detecting a collision from the structure-borne sound can trigger an evaluation of the acceleration signal. Compared with conventional apparatuses, this offers a timing advantage, since the structure-borne sound is detected some time before the acceleration. For the sake of a short tripping time, valuable milliseconds - in particular for tripping side air bags - can be gained, compared with evaluating the acceleration signal.

Even if the detonation decision is made solely by one or more structure-borne sound sensors, there is still a timing advantage over conventional acceleration detection, since the spectral components of the structure-borne sound are above 10 kHz, but the spectral components of the acceleration are below 400 Hz, and thus a faster decision can be made when structure-borne sound sensors are used.

I claim:

1. In a vehicle having a body component and an occupant protection device, an apparatus for controlling the occupant protection device, the apparatus comprising:

a sound sensor for picking up spectral components above 10 kHz of a transverse structure-borne sound deflection of the body component; and an evaluator for triggering the occupant protection device in dependence on the presence of transverse structure-borne sound deflection above 10 kHz.

2. The apparatus according to claim 1, wherein said sound sensor is disposed in a control unit adapted to be secured to the body component of the vehicle.

3. The apparatus according to claim 1, wherein the body component is a bearer disposed centrally in the vehicle.

4. The apparatus according to claim 1, wherein said sound sensor is embodied as a piezoelectric sensor.

5. The apparatus according to claim 1, wherein said evaluator evaluates an amplitude of the transverse structure-borne sound deflection.

6. The apparatus according to claim 4, wherein said evaluator evaluates a change in the amplitude over time of the transverse structure-borne sound deflection.

7. The apparatus according to claim 1, wherein said evaluator evaluates a frequency of the transverse structure-borne sound deflection.

8. The apparatus according to claim 6, wherein said evaluator evaluates a change in the frequency over time of the transverse structure-borne sound deflection.

9. The apparatus according to claim 1, including an acceleration sensor for picking up an acceleration, the occupant protection device being controlled in dependence on the acceleration and on the transverse structure-borne sound deflection.

10. An apparatus for controlling an occupant protection device in a vehicle having a body component, the apparatus comprising:

a sound sensor for picking up spectral components above 10 kHz of a transverse structure-borne sound deflection of the body component; and an evaluator for triggering the occupant protection device in dependence on the presence of transverse structure-borne sound deflection above 10 kHz.

11. The apparatus according to claim 10, wherein said sound sensor is disposed in a control unit adapted to be secured to the body component of the vehicle.

12. The apparatus according to claim 10, wherein the body component is a bearer disposed centrally in the vehicle.

13. The apparatus according to claim 10, wherein said sound sensor is embodied as a piezoelectric sensor.

14. The apparatus according to claim 10, wherein said evaluator evaluates an amplitude of the transverse structure-borne sound deflection.

15. The apparatus according to claim 13, wherein said evaluator evaluates a change in the amplitude over time of the transverse structure-borne sound deflection.

16. The apparatus according to claim 10, wherein said evaluator evaluates a frequency of the transverse structure-borne sound deflection.

17. The apparatus according to claim 15, wherein said evaluator evaluates a change in the frequency over time of the transverse structure-borne sound deflection.

18. The apparatus according to claim 10, including an acceleration sensor for picking up an acceleration, and the occupant protection device being controlled in dependence on the acceleration and on the transverse structure-borne sound deflection.

\* \* \* \* \*